United States Patent [19]

Hurley et al.

[11] Patent Number: 4,936,914
[45] Date of Patent: Jun. 26, 1990

[54] FILM-FORMING EMULSION POLISH COMPOSITIONS CONTAINING COPOLYMERIC SILOXANES

[75] Inventors: Steve M. Hurley, Racine; Eric J. Miller, Mt. Pleasant Township, Racine County; Husam A. A. Rasoul, Caledonia Township, Racine, County, all of Wis.

[73] Assignee: S. C. Johnson & Con, Inc., Racine, Wis.

[21] Appl. No.: 286,907

[22] Filed: Dec. 20, 1988

[51] Int. Cl.$^5$ ........................... C09G 1/10; C09D 3/02
[52] U.S. Cl. ......................................... 106/3; 556/456
[58] Field of Search .............................. 106/3; 556/456

[56] References Cited

U.S. PATENT DOCUMENTS

| | | | |
|---|---|---|---|
| 2,523,281 | 9/1949 | Currie | 106/3 |
| 2,584,413 | 2/1952 | Baer et al. | 106/11 |
| 2,698,805 | 1/1955 | Currie et al. | 106/8 |
| 2,755,194 | 7/1956 | Volkmann et al. | 106/285 |
| 2,856,297 | 10/1958 | Green | 106/3 |
| 2,868,657 | 1/1959 | Sesso | 106/10 |
| 2,907,664 | 10/1959 | Schoenholz et al. | 106/10 |
| 3,306,869 | 2/1967 | Lahr et al. | 106/11 |
| 3,341,338 | 9/1967 | Pater | 106/10 |
| 3,395,028 | 7/1968 | Mackles | 106/8 |
| 3,549,590 | 12/1970 | Holdstock et al. | 106/3 |
| 3,632,533 | 1/1972 | Winkler | 521/75 |
| 3,847,622 | 11/1974 | Brandl et al. | 106/10 |
| 3,856,533 | 12/1974 | Schnurrbusch et al. | 106/10 |
| 4,113,677 | 9/1978 | Svedas et al. | 524/277 |
| 4,163,673 | 8/1979 | Dechert | 106/10 |
| 4,217,396 | 8/1980 | Heckles | 428/500 |
| 4,218,250 | 8/1980 | Kasprzak | 106/3 |
| 4,269,739 | 5/1981 | Grejsner | 252/547 |
| 4,311,608 | 1/1982 | Maurice | 252/143 |
| 4,315,046 | 2/1982 | Frye | 427/322 |
| 4,354,871 | 10/1982 | Sutton | 106/3 |
| 4,404,035 | 9/1983 | Ona et al. | 106/271 |
| 4,462,828 | 7/1984 | Otsuki | 106/3 |
| 4,613,646 | 9/1986 | Sandvick | 524/476 |

FOREIGN PATENT DOCUMENTS 187077  3/1981  Czechoslovakia .

Primary Examiner—Theodore Morris

[57] ABSTRACT

Disclosed are emulsion polish compositions comprising a copolymeric siloxane selected from the group consisting of a poly(dimethyl)-co-poly(methylalkyl) siloxane polymer, a poly(dimethyl)-co-poly(methyl, oxygen-containing) siloxane polymer, and combinations thereof. The poly(dimethyl)-co-poly(methylalkyl) siloxane copolymer has the formula

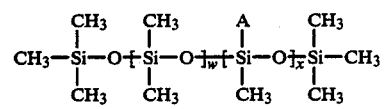

wherein "A" is an alkyl radical having 10–20 carbon atoms, and wherein "w" is 70–91 mole percent and "x" is 9–30 mole percent. The poly(dimethyl)-co-poly(methyl, oxygen-containing) siloxane copolymer has the formula

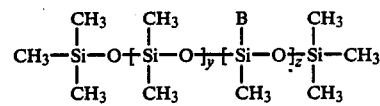

wherein "B" is $(CH_2)_i(L)(CH_2CH_2O)_nR$, wherein "i" is an integer from 3 to 10 inclusive, wherein "L" is either —O— or —COO—, wherein "n" is either zero or an integer from 1 to 3 inclusive, wherein "R" is —H, —CH$_3$, or —C$_2$H$_5$, and wherein "y" is 62–92 mole percent and "z" is 8–38 mole percent.

9 Claims, No Drawings

FILM-FORMING EMULSION POLISH COMPOSITIONS CONTAINING COPOLYMERIC SILOXANES

TECHNICAL FIELD OF THE INVENTION

The present invention is generally directed to film-forming emulsion polish compositions for furniture and similar household items. Depending upon the composition makeup, the emulsion can either be a water-in-oil emulsion or an oil-in-water emulsion. The emulsion polish compositions of the present invention, which are specifically formulated to provide rapid smear recovery, contain certain specified copolymeric siloxanes, briefly described below.

Those copolymeric siloxanes of the present invention, in particular, are briefly described as poly(dimethyl)-co-poly(methylalkyl) siloxane copolymers and poly(dimethyl)-co-poly(methyl, oxygen-containing) siloxane copolymers.

The present invention is thus more particularly directed to polish compositions for furniture and similar household goods, wherein such compositions contain either poly(dimethyl)-co-poly(methylalkyl) siloxane polymer, poly(dimethyl)-co-poly(methyl, oxygen-containing) siloxane polymer, or combinations thereof.

Emulsion polish compositions containing these copolymeric siloxanes have been observed to possess rapid smear-recovery properties while exhibiting desirable depth-of-gloss properties as well as certain other desirable film properties.

BACKGROUND OF THE INVENTION

The ability of a polished surface to return to its original appearance after being smeared and the amount of time required to do so are two factors which tend to be rather important in the evaluation of the performance of a furniture polish composition.

Upon application onto a particular substrate surface, the polish compositions of the present invention have been observed to form a rather thin (approximately 1000 to 4000 Angstroms) generally uniform film on the substrate surface. Due to the liquid nature of the resultant films of the surface-applied emulsion polish compositions of the present invention, such films typically exhibit, to a degree, visible physical evidence of surface disturbances, otherwise referred to as surface "smears", when the surface-applied film is subjected to a rubbing action.

The term "smear recovery", as used herein, denotes not only the rate-of-recovery but also the ability of a thus "smeared" surface-applied polish film to return to its original surface appearance.

Polish compositions possessing superior smear recovery properties have long been desired. Conventional polishes, however and in particular the surface-applied films they produce lack this quality. For example, commercial polishes that use conventional silicone-containing or conventional silicone-based fluids, as well as certain conventional waxes, and certain low molecular weight organic oils as glossing agents seemingly initially tend to provide certain desirable surface-appearance values but, in fact, ultimately suffer from certain inherent disadvantages. Such conventional polishes, in particular, readily tend to show certain surface disturbances such as fingerprints and otherwise readily tend to smear.

Certain investigations discussed in the prior-art references reviewed by us have attacked these and other surface "smear" problems by attempting to produce specific smear-resistant polishes which are said to provide treated surfaces that have relatively permanent finishes. Such so-called "permanent" finishes are said to require the application of significant force before their surface properties are disturbed. While such finishes tend to provide both high gloss and smear resistant properties, it is generally more difficult to remove these so-called "permanent" finishes; and such finishes thus have the tendency to build up with multiple applications.

Smear resistant films of this type are described e.g. in U.S Pat. No. 3,847,622 to Brandl et al. The disclosed compositions of Brandl et al. contain water, wax, a mixture of organopolysiloxanes a solvent, and a water-in-oil emulsifier. Such compositions furthermore, are said to be substantially devoid of any tendency to smear or streak and are further said to be easily applied with a minimum of physical effort. Brandl et al. teach however that the use of silicones of diverse types, i.e. organopolysiloxanes, while beneficial from the standpoint of luster, gloss and durability nevertheless fail to provide appreciable mitigation of the smear problem as they view it. The emulsion polish compositions disclosed by Brandl et al. are thus said to possess a "particularly high resistance to smearing."

In U.S. Pat. No. 3,856,533, Schnurrbusch et al. disclose certain wax-containing surface-polish compositions which are said to be resistant to "finger-marking". Such compositions are disclosed as containing an organopolysiloxane (such as dimethylsiloxane), a wax, and a specified so-called "organosiloxane" containing an alkyl, an alkenyl, or a monocyclic aryl radical.

The present invention, in contradistinction to the prior art briefly discussed hereinabove, approaches the so-called "smear problem" in a manner which is markedly different from the approach set forth either in U.S. Pat. No. 3,847,622 to Brandl et al. or in U.S. Pat. No. 3,856,533 to Schnurrbusch et al. The present invention, in particular, enhances the smear-recovery properties of the emulsion polish compositions disclosed herein. Indeed, the unexpected and significant increase in smear recovery which is attributable to the polysiloxane copolymers of our present invention, is shown in the comparative-example data presented hereinbelow. In particular, the smear-recovery properties of the novel emulsion polish compositions disclosed herein were not recognized by any of the prior-art polish formulators whose work we reviewed The prior-art references which we reviewed while disclosing numerous furniture polishes using polysiloxanes, thus do not teach, disclose or even suggest the novel polysiloxane copolymers of our present invention. In particular, and as mentioned above, the novel polysiloxane copolymers of our invention have been demonstrated, by comparative example, as being unexpectedly superior over prior-art polysiloxanes such as polydimethylsiloxane. Indeed, it was only through our present discovery that the surprising smear-recovery properties of the emulsion polish compositions of the present invention came to light.

In U.S. Pat. No. 2,698,805 to Currie et al., for example, there are disclosed certain conventional polishes which are said to be easy to apply. Such conventional emulsion polish compositions contain a hydrocarbon-soluble organopolysiloxane having from 1 to 3 aryl, alkyl, or arylkyl radicals per silicon atom. Such emulsion polish compositions further include a hydrocarbon solvent a specified aluminum stearate compound, and water. The alkyl radicals which Currie et al. disclose are methyl, ethyl, propyl and octadecyl. The polish compositions disclosed by Currie et al., furthermore, are said to be smear-free. In contradistinction, the polish compositions of our present invention do indeed smear; but, upon being smeared, recover more rapidly than conventional compositions containing conventional polydimethylsiloxane polymers of comparable viscosity and/or weight-average molecular weight relative to the above-mentioned polymeric siloxanes disclosed herein.

Indeed the concept of rapid smear recovery is not disclosed or even suggested by Currie et al. Moreover, the preferred organopolysiloxane disclosed in the Currie '805 patent, namely dimethylpolysiloxane fluid, is shown hereinbelow as being inferior to the siloxane-containing compositions of the present invention with regard to smear-recovery properties.

Further, U.S. Pat. No. 2,523,281 to Currie, is directed to automobile polishes containing an organopolysiloxane having from 1 to 3 aryl, alkyl or alkaryl radicals per silicon atom. Such automobile polishes also include a hydrocarbon solvent, finely-divided silica of a specified particle size, an emulsifying agent, and water. The disclosed alkyl radicals include methyl, ethyl, propyl, and octadecyl. Disclosed in this patent, furthermore, as the preferred organo polysiloxanes, are certain dimethylpolysiloxanes which are shown hereinbelow as possessing inferior smear-recovery properties as compared to those siloxanes utilized in accordance with the principles of the present invention.

Still other patents, disclosing the use of polysiloxanes in furniture-care compositions, do not disclose the novel emulsion polish compositions of the present invention. In particular, U.S. Pat. Nos. 4.163.673 to Dechert; 4,354,871 to Sutton; and U.S. Pat. No. 4,613,646 to Sandvick all disclose that dimethyl polysiloxane or polydimethyl siloxane is an especially-preferred polysiloxane for use in furniture polish compositions. Such siloxanes however form no part of the novel emulsion polish compositions of the present invention.

Indeed, the prior art does not disclose or even suggest the specific poly(dimethyl)-co-poly(methylalkyl) siloxane and poly(dimethyl)-co-poly(methyl, oxygen-containing) siloxane copolymers of the present invention; nor does the prior art disclose or even suggest the unexpected smear-recovery properties of compositions containing the siloxane copolymers of the present invention.

For example, U.S. Pat. No. 4,404,035 to Ona et al. discloses wax compositions comprising certain hydrocarbon ester-containing organopolysiloxanes, i.e. specified organopolysiloxanes containing at least one silicon-bonded hydrocarbon-ester group. The Ona et al. patent does not, however, teach or even suggest the usefulness of alkylene oxide polysiloxanes. Ona et al., in particular, teach away from using alkylene oxide polysiloxanes, as is shown by way of their so-called "solution D", as presented in their Example 2. That is, Ona et al., in their Example 2, specifically report that a polysiloxane having a side chain containing an alkylene oxide having the following formula

produced a coating on a metal panel which, after being subjected to a 20-hour water shower, was deemed to be unacceptable in luster, water-repellency and durability.

In U.S. Pat. No. 4,218,250 to Kasprzak, there is disclosed a wax-containing and/or abrasive-containing formulation which includes a cyclodimethyl siloxane fluid and a polydiorgano siloxane polyoxyalkylene copolymer. The disclosed polish formulation may also include a specific silicon-glycol copolymer having the following formula

wherein x has an average value of 0 to 10, y has an average value of 1 to 10, G has the formula, —D—(OC$_2$H$_4$)$_z$OH, with D being an alkylene radical containing from 2 to 10 carbon atoms and z having an average value of from 6 to 20. This patent, however, does not mention smear resistance or smear recovery; nor does this patent otherwise disclose either the specific poly(dimethyl)-co-poly(methylalkyl) siloxane or poly(dimethyl)-co-poly(methyl, oxygen-containing) siloxane copolymers of the present invention.

Additionally U.S. Pat. No. 3,306,869 to Lahr et al. discloses floor polishes which are said to possess desirable so-called "leveling" properties as well as acceptable "scuff-resistance" properties. Such floor polishes comprise a wax, a modified rosin, an emulsifying agent, and a polysiloxane-oxyalkylene block copolymer having a molecular weight below about 25,000 and a polysiloxane content in the range of from about 30 to about 60 percent by weight. U.S. Pat. No. 3,341,338 to Pater also discloses a polish formulation comprising a polysiloxane-oxyalkylene block copolymer and a wax. Neither patent, however, discloses or even suggests "smear recovery", or otherwise discloses the specific poly(dimethyl)-co-poly(methylalkyl) siloxane or poly(dimethyl)-co-poly(methyl, oxygen-containing) siloxane copolymers of our present invention.

From the above discussion, it can either be implied that the smear-recovery problems associated with certain prior-art polish compositions are not appreciated or, if such problems have become recognized by those skilled in the art, it can be implied that an acceptable solution to the smear-recovery problem is still generally unknown to those skilled in the art.

Accordingly there is presently a need for polish compositions which possess rapid smear-recovery properties. One object of our invention, therefore, is to provide polish compositions for furniture and other similar household items, wherein such polish compositions exhibit rapid smear-recovery qualities.

It is yet another object of our invention to provide furniture polish compositions which may be applied and removed with a minimum of effort, and which possess not only rapid smear-recovery properties but also acceptable so-called "depth-of-gloss" characteristics as well.

The foregoing, as well as other objects, features and advantages of our invention will become more readily clear to those skilled in the art upon reference to the following summary and detailed description.

SUMMARY OF THE INVENTION

One aspect of our present invention is thus directed to a surface-treating emulsion composition for furniture and similar household items. The emulsion composition, in particular, comprises water, at least one hydrocarbon solvent, at least one surfactant, and at least one copolymeric siloxane, herein referred to as a poly(dimethyl)-co-poly(methylalkyl) siloxane copolymer having the general formula

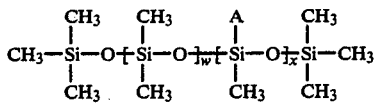

wherein A is an alkyl radical having 10 to 20 carbon atoms, wherein the above-presented copolymeric siloxane has a weight-average molecular weight of about 2,500 to about 4,000 and a viscosity of about 20 to about 200 centipoise, and wherein the "w" value is about 70 to about 91 mole percent and the "x" value is about 9 to about 30 mole percent of the above-presented copolymeric siloxane.

Yet another aspect of our present invention is directed to yet another surface-treating emulsion composition for furniture and similar household items. Such an emulsion composition, in contradistinction to what was briefly disclosed above, comprises water, at least one hydrocarbon solvent, at least one surfactant, and at least one other copolymeric siloxane, herein referred to as a poly(dimethyl)-co-poly(methyl, oxygen-containing) siloxane copolymer having the general formula

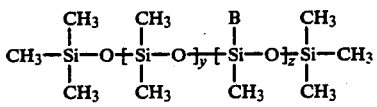

wherein B is $(CH_2)_i(L)(CH_2CH_2O)_nR$, wherein i is an integer from 3 to 10 inclusive, wherein L is —O— or —COO—, wherein n is either zero or an integer from 1 to 3 inclusive, wherein R is —H, —CH$_3$, or —C$_2$H$_5$, wherein the copolymeric siloxane has a weight-average molecular weight of about 1,000 to about 4,000 and a viscosity of about 10 to about 250 centipoise and wherein the "y" value is about 62 to about 92 mole percent and the "z" value is about 8 to about 38 mole percent of the second above-presented copolymeric siloxane.

The second above-presented copolymeric siloxane is thus characterized as a poly(dimethyl)-co-poly(methyl, oxygen-containing) siloxane copolymer because the latter portion thereof contains at least one methyl group and at least one oxygen group.

In accordance with the above, still other surface-treating emulsion compositions for furniture and similar household items comprise combinations of the copolymeric siloxanes briefly summarized above.

We observed that the above-summarized copolymeric siloxanes possess surprising and unexpected smear-recovery properties, as compared to the above-described siloxane copolymers which we investigated in connection with the prior-art references mentioned above.

DETAILED DESCRIPTION OF THE PREFERRED EMBODIMENTS

Thus, one embodiment of the polish composition of our invention comprises water, at least one hydrocarbon solvent, at least one surfactant, and at least one copolymeric siloxane.

The copolymeric siloxanes of our present invention are selected from the group consisting of poly(dimethyl)-co-poly(methylalkyl) siloxane copolymer, poly(dimethyl)-co-poly(methyl, oxygen-containing) siloxane copolymer, and combinations thereof.

The poly(dimethyl)-co-poly(methylalkyl) siloxane copolymer of our invention, more particularly, has the general formula

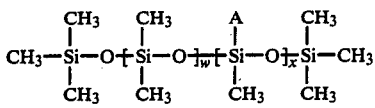

wherein A is an alkyl radical having 10 to 20 carbon atoms, wherein the copolymeric siloxane has a weight-average molecular weight of about 2,500 to about 4,000 and a viscosity of about 20 to about 200 centipoise, and wherein the "w" value is about 70 to about 91 mole percent and the "x" value is about 9 to about 30 mole percent of the copolymeric siloxane. (The above-mentioned "x" and "w" mole-percentage values, when added together, thus equal 100%.)

A more preferred poly(dimethyl)-co-poly(methylalkyl) siloxane copolymer has a "w" value (the mole percent of silicon atoms having dimethyl groups attached) of about 85 to about 95 mole percent of the copolymeric siloxane and an "x" value (the mole percent of silicon atoms having at least one C$_{10}$–C$_{20}$ alkyl group attached) of about 5 to about 15 mole percent of the copolymeric siloxane.

A still more preferred poly(dimethyl)-co-poly(methylalkyl) siloxane copolymer has a weight-average molecular weight of about 2,500 to about 3,500, a viscosity of about 25 to about 250 centipoise, a "w" value of about 90 mole percent, and an "x" value of about 10 mole percent.

The alkyl radicals (depicted as "A" in the above-presented formula) of these preferred poly(dimethyl)-co-poly(methylalkyl) siloxane copolymers include only even-numbered alkyl radicals; and such siloxane copolymers thus only have either 10, 12, 14, 16, 18 or 20 carbon atoms.

The poly(dimethyl)-co-poly(methyl, oxygen-containing) siloxane copolymer of this invention has the general formula

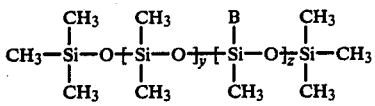

wherein B is $(CH_2)_i(L)(CH_2CH_2O)_nR$, wherein i is an integer from 3 to 10 inclusive, wherein L is —O— or —COO—, wherein n is either zero or an integer from 1 to 3 inclusive. wherein R is —H, —CH$_3$, or —C$_2$H$_5$, wherein the copolymeric siloxane has a weight-average molecular weight of about 1,000 to about 4,000 and a viscosity of about 10 to about 250 centipoise, wherein the "y" value is about 62 to about 92 mole percent, and the "z" value is about 8 to about 38 mole percent of the copolymeric siloxane. [The above-mentioned "y" and "z" mole-percentage values of a particular poly(dimethyl)-co-poly(methyl, oxygen-containing) siloxane copolymer, when added together thus equal 100%.] It is further contemplated, within the scope of our present invention, that the CH$_2$CH$_2$O group shown in the "B" side chain can be substituted by CH$_2$CH$_2$CH$_2$O CH$_2$CH(CH$_3$)O.

A more preferred poly(dimethyl)-co-poly(methyl, oxygen-containing) siloxane copolymer has a viscosity of about 20 to about 110 centipoise, a "y" value (the mole percent of silicon atoms having dimethyl groups attached) of about 85 to 95 mole percent of the copolymeric siloxane, and a "z" value (the mole percent of silicon atoms having a methyl and an oxygen-containing group attached) of about 5 to 15 mole percent of the copolymeric siloxane.

A still more preferred poly(dimethyl)-co-poly(methyl, oxygen-containing) siloxane copolymer has a weight-average molecular weight of about 3,000 to about 3,500 and a viscosity of about 20 to about 100 centipoise. Such preferred copolymeric siloxanes, moreover, have an "R" value of either $-CH_3$ or $-C_2H_5$.

Specific examples of still other, particularly preferred poly(dimethyl)-co-poly(methyl, oxygen-containing) siloxane copolymers are described in the below-discussed examples.

Typically, the copolymeric siloxanes of the present invention are employed in amounts ranging from about 0.5 to about 50 weight percent, based upon the total weight of a specified composition (exclusive of any propellant), with concentrations of about 1 to about 10 weight percent being preferred, and with concentrations of about 1 to about 5 weight percent being even more preferred.

The concentration of copolymeric siloxane, utilized in such a specified composition, is not critical. Indeed those skilled in the art can well appreciate that specific copolymeric siloxane amounts will generally be dictated in accordance with the relative proportions of certain other ingredients which are included in a particular composition.

Such is also true of each of the other ingredients of the compositions of our present invention. That is the concentrations of other ingredients, described in greater detail hereinbelow, are not critical and are given only to exemplify the present invention.

The emulsion polish compositions of the present invention can be either oil-in-water (i.e. so-called "water out") emulsions or water-in-oil (i.e. so-called "oil out") emulsions. Those skilled in the art can readily choose an appropriate surfactant (or emulsifier), or combination of surfactants (or emulsifiers), to produced the desired type of emulsion.

As those skilled in the art can well appreciate, the term "emulsion" is generally recognized as connoting a stable mixture of two or more mutually immiscible liquids held in suspension by small percentages of substances called emulsifiers (or surfactants). All emulsions, moreover, are characterized as comprising a continuous phase and a discontinuous phase which is dispersed throughout the continuous phase.

In the emulsion polish compositions of our present invention, the hydrocarbon solvents and surfactants described below are typically those conventionally used in furniture polish compositions. The critical component, insofar as the present invention is concerned thus is either the poly(dimethyl)-co-poly(methylalkyl) siloxane copolymer, the poly(dimethyl)-co-poly(methyl, oxygen-containing) siloxane copolymer, or both such siloxane copolymers (for certain polish compositions containing both).

In general, solvents are typically utilized in conventional polish compositions for purposes of removing solvent-soluble residues from substrate surfaces. For optimum results, therefore, any solvents that are utilized in preparing the emulsion polish compositions of this invention should be sufficiently volatile so as to bring about rapid drying after the composition has been applied to a substrate surface, and yet, not so volatile as to prematurely dry up before desired spreading of the composition onto the substrate surface (for purposes of providing a desired film) has taken place.

Accordingly, those solvents deemed particularly useful, in accordance with the principles of our present invention, have so-called "kauri-butanol" values of from about 20 to about 50, and have boiling-point ranges of from about 60° to about 210° C. and preferably from about 95° to about 150° C.

A wide variety of commercially-available isoparaffinic hydrocarbon solvents, such as those commercially available from the Exxon Corporation under the "Isopar" brand as well as the isoparaffinic-type hydrocarbon solvents commercially available from the Phillips Petroleum Corporation under the "Soltrols" brand, are moreover presently preferred because they are substantially odor-free.

Other suitable hydrocarbon solvents, in accordance with the principles of the present invention, include hexane heptane and the so-called "Stoddard" solvents.

The various above-described hydrocarbon solvents, furthermore, can be utilized individually or in combination.

The hydrocarbon solvent can be present in amounts of from about 0.15 to about 90 weight percent, based on the total weight of the emulsion polish composition (excluding any propellant, if present), preferably, however, the hydrocarbon solvent will be present in an amount of from about 1.0 to about 25 percent with about 5 to about 20 weight percent being even more preferred.

As was briefly mentioned above, all emulsions comprise a continuous phase and a discontinuous phase. While the amount of surfactant (or emulsifier) present in the emulsion polish compositions of our present invention is not critical, it is to be understood that such emulsion polish compositions must include an amount of surfactant (or emulsifier), or an amount of combinations of surfactants (or emulsifiers), for effectively dispersing the discontinuous phase throughout the continuous phase.

Accordingly, surfactants (or emulsifiers) useful for purposes of our present invention include conventional non-ionic, cationic, and anionic surfactants (or emulsifiers) commonly employed in commercial polishes for application to furniture surfaces. Such conventional surfactants can be used alone or in combination.

In preferred embodiments of our present invention, certain conventional non-ionic surfactants, as well as certain combinations of conventional non-ionic surfactants, are utilized because they provide desirable emulsion-stability properties. Conventional non-ionic surfactants (or emulsifiers), suitable for purposes of the present invention, include, but are not limited to, the so-called "sorbitan" esters of oleic and lauric acids; those polyethoxylated sorbitan esters having up to 20 ethoxy units; the monoglycerides and diglycerides of the fat-forming fatty acids; and combinations thereof.

Additional examples of preferred, commercially-available non-ionic surfactants (or emulsifiers) include certain "Span" brand and "Tween" brand emulsifiers, both presently available from ICI Americas Inc.; and the "Monamid" brand emulsifiers, presently available from Mona Industries, Inc. Particular examples of such emulsifiers include sorbitan monooleate, sold by ICI Americas, Inc., under the "SPAN 80" brand; sorbitan monolaurate, sold by ICI Americas. Inc., under the "SPAN 20" brand; and sorbitan monopalmitate, sold by ICI Americas, Inc., under the "SPAN 40" brand. Mixtures of the various above-mentioned surfactants (or emulsifiers) can also be utilized, if desired, in accordance with the principles of our present invention.

It is further contemplated or expected that the following conventional cationic surfactants or emulsifiers would be suitable for purposes of our present invention. These include certain quaternary ammonium compounds such as the quaternary ammonium halides, the quaternary ammonium sulfates, those so-called "fatty" amines which are ethoxylated and have about 2 to about 10 moles of ethylene oxide, and the chloride salts or acetate salts of amines, as well as those amines which are ethoxylated and have 2 or more moles of ethylene oxide. Mixtures of the above surfactants (or emulsifiers) can also be utilized by those skilled in the art, in accordance with the principles of our invention, if desired.

Conventional anionic surfactants or emulsifiers, suitable for purposes of our present invention, include certain sulfates (such as sodium lauryl sulfate and the sodium alkyl ether sulfates), those sulfosuccinates containing polyethylene glycol moieties attached thereto and the alkyl aryl sulfonates. Mixtures of the above surfactants (or emulsifiers) can also be utilized, in accordance with the principles of our present invention, if desired.

The surfactants (or emulsifiers), mentioned above, while not critical, can thus be present in the compositions of our present invention in amounts ranging from about 0.1 to about 10 weight percent, based on the total weight of our emulsion polish composition (exclusive of any propellant, if present). with from about 0.2 to about 1.2 weight percent being preferred.

The emulsion polish compositions of this invention also contain water as the principal constituent of the emulsion. The presence of water in the emulsion polish composition of our invention has been observed to assist in the "leveling" of the resultant film of the emulsion polish composition, upon application of such a film to a substrate surface. The presence of water, moreover, tends to remove any water-soluble soil particles that may be present on the thus-treated substrate surface. Generally water will therefore make up the balance of the emulsion polish composition, taking into account the active ingredients noted above; and such balance amount of water is accordingly present in an amount ranging from about 2 to about 99 weight percent, based upon the total weight of the composition (exclusive of any propellant, if present), with concentrations of about 66 to about 93 weight percent being preferred.

As was briefly implied above, the most preferred emulsion polish compositions of this invention are totally wax-free. However, it may be desirable, in certain situations, to utilize a relatively minor amount of wax in specific formulations. Thus, from about 0.1 to about 0.5 weight-percent wax, based upon total weight of the emulsion polish composition, may be employed in the furniture polish compositions of the present invention. Conventional waxes, suitable for purposes of our invention, accordingly include, but are not limited to, certain synthetic waxes such as the microcrystalline waxes and the petroleum waxes as well as certain natural waxes such as the candellila and the carnauba waxes.

Still other well-known additives, including but not limited to perfumes and preservatives, may be added to the emulsion polish compositions of our present invention. Perfumes are typically added, for example, to impart a desired fragrance. Conventional perfumes, suitable for purposes of the present invention, are well known to those skilled in the art and accordingly need not be described in detail here. The amount of perfume which is included is typically present in an amount that is effective for imparting a desired fragrance intensity. Such an amount of perfume can range, for example, from about 0.05 to about 1 weight percent, based upon the total weight of the emulsion polish composition (exclusive of any propellant, if present).

Preservatives, typically formaldehyde, are generally utilized to retard or otherwise thwart undesired bacterial activity within packages containing certain formulations of the emulsion polish compositions of the present invention. As those skilled in the art can well appreciate, the presence of such preservatives is for prolonging the shelf life of the thus-formulated emulsion polish composition product. A variety of well-known conventional quaternary compounds can moreover be utilized for such a purpose.

The emulsion polish compositions of the present invention can be applied directly onto a substrate surface, utilizing e.g. a wide variety of well-known conventional pressurized systems containing an appropriate amount of a liquid or gaseous propellant. In particular, the emulsion polish compositions can be applied directly onto a substrate surface, utilizing well-known spray means such as conventional pump sprayers. Additionally the emulsion polish compositions can be applied to furniture surfaces, utilizing a polishing cloth, or other suitable means.

Furthermore, the emulsion polish compositions of our present invention can be provided in aerosol form, depending upon the particular copolymeric siloxane compound or compound mixture which is utilized in the emulsion polish composition. To produce such an aerosol form, the emulsion polish composition (containing such an appropriate copolymeric siloxane compound or compound mixture) is introduced into a conventional aerosol container which is then capped with an aerosol valve. Thereafter, an effective amount of a suitable, conventional propellant is introduced into the aerosol container, in a known manner for achieving a desired pressure in the container. Such propellant pressure should therefore be sufficient for enabling substantially complete expulsion of the aerosol container-contained ingredients, in the form of a spray in the desired manner, through the aerosol valve. Any of a wide variety of suitable conventional propellants which may be used include such well-known liquified hydrocarbons propellant gases as isobutane, n-butane and propane, and such well-known halogenated hydrocarbons as difluoroethane and the "Freon" brand of propellants, sold by E. I. Du Pont de Nemours & Co. Mixtures of halogenated hydrocarbons and other hydrocarbons may also be used in accordance with the principles of the present invention, if desired.

The aerosol emulsion polish compositions of this invention typically contain between about 5 and about 30 weight percent of propellant, based upon the total weight of the aerosol-containing emulsion polish composition of the present invention. The weight percentage or concentration of propellant is not critical and thus can vary widely depending on the desired end use.

Moreover, the precise method of manufacturing the polish compositions of this invention is not critical. The order and/or manner of addition of the various emulsion polish composition ingredients, mentioned above, may accordingly generally be varied and typically will not affect the quality of a particular emulsion polish composition which is thus being formulated or produced. Conventional techniques for forming water-in-oil and oil-in-water emulsion polishes are typically used to produce the various embodiments of the emulsion polish compositions of the present invention.

The so-called "wax-free" emulsion polish composition embodiments of the present invention are prepared utilizing a known, so-called "cold-blend" process. One conventional cold-blend processing method, suitable for purposes of the present invention, comprises charging the oil-phase ingredients (namely, the hydrocarbon solvent, the polysiloxane, the surfactant, and fragrance, if present) into a vessel of suitable dimension, preferably equipped with agitation means, and thereafter mixing the oil-phase ingredients until a homogeneous blend is achieved. Water and any other aqueous-phase ingredients (e.g. preservative) are next slowly added to the vessel, while maintaining a moderate degree or amount of agitation, to thereby produce the emulsion polish composition. If it is necessary to stabilize the thus-produced emulsion polish composition, the resulting composition can then e.g. be homogenized by passing such emulsion polish composition through a 3/64 inch diameter orifice, utilizing a 60 to 80 psig pressure drop across the orifice.

Wax, if a component of the emulsion polish composition of the present invention, is added with the initial oil-phase ingredients; and the resultant mixture is then heated to a temperature sufficient to melt the wax and achieve a homogeneous mixture. After the addition of water and any other ingredients, the wax-containing composition is either cooled or allowed to cool to room temperature (i.e. 25° C.) and is preferably thereafter homogenized.

Still other aspects, advantages and features of the present invention will become apparent upon reviewing the following examples, which are illustrative and not intended to limit the scope of the present invention except as defined in the appended claims.

All percentages set forth herein are by weight of the total composition, unless otherwise indicated.

In the following examples, certain preferred embodiments of the emulsion polish compositions of our invention are presented. Also presented are certain comparative examples, documenting comparative testing of the copolymeric siloxanes of the present invention with respect to several prior-art polysiloxanes.

Typical emulsion polish compositions of the present invention include:

| Formulation Ingredients | Preferred Wt. % | More Preferred Wt. % |
| --- | --- | --- |
| copolymeric siloxane | 0.5–50 | 1–10 |
| hydrocarbon solvent | 0.15–90 | 5–20 |
| surfactant | 0.1–10 | 0.2–1.2 |
| water | 2–99 | 67–94 |
| additives | 0–50 | 0–2 |

Preferred and exemplary embodiments of the present invention are set forth in Tables 1–5, below. The numerical values shown below represent weight concentrations (i.e., percent by weight of the total composition) of the various ingredients included therein.

TABLE 1

| Poly(dimethyl)-co-poly(methylalkyl) Siloxane Emulsion Polish Composition | |
| --- | --- |
| Ingredients | Wt. % |
| poly(dimethyl)-co-poly(methylalkyl) siloxane[a] | 4.6 |
| sorbitan monooleate[b] | 0.45 |
| polyoxyethylene 20 sorbitan monooleate[c] | 0.02 |
| fragrance | 0.4 |
| isoparaffinic hydrocarbon[d] | 19.2 |
| formaldehyde | 0.20 |
| water | 75.13 |

Footnotes:
[a]The Poly(dimethyl)-co-poly(methylalkyl) siloxane was poly (90 mole %) dimethyl-co-poly (10 mole %) methylhexadecyl siloxane, having a weight-average molecular weight of 2852.
[b]One surfactant utilized, the sorbitan monooleate, was SPAN 80 brand surfactant.
[c]The other surfactant utilized, the polyoxyethylene 20 sorbitan monooleate, was TWEEN 80 brand surfactant.
[d]The isoparaffinic hydrocarbon utilized, Isopar C brand isoparaffinic hydrocarbon, has a flash Point of 40° F.

The copolymeric siloxane that can be utilized in the formulation presented in Table 1 include poly(dimethyl)-co-poly(methylalkyl) siloxanes having a weight-average molecular weight of about 2,5000 to about 4,000, a viscosity of about 20 to about 200 centipoise, and an "x" value (the mole percentage of silicon atoms having at least one $C_{10}$–$C_{20}$ alkyl group attached thereto) of about 9 to about 30 mole percent.

TABLE 2

| Poly(dimethyl)-co-poly(methyl, oxygen-containing) Siloxane Emulsion Polish Composition | |
| --- | --- |
| Ingredients | Wt. % |
| poly(dimethyl)-co-poly(methyl, oxygen-containing) siloxane[e] | 5.00 |
| sorbitan monooleate[f] | 0.50 |
| polyoxyethylene 20 sorbitan monooleate[g] | 0.02 |
| fragrance | 0.30 |
| isoparaffinic hydrocarbon[h] | 12.00 |
| formaldehyde | 0.20 |
| water | 81.98 |

Footnotes
[e]The poly(dimethyl)-co-poly(methyl, oxygen-containing) siloxane utilized was a poly (91 mole-percent) dimethyl-co-poly (9 mole-percent) methylethoxyethyoxyethylundecanoatyl siloxane, having a weight-average molecular weight of 3224.
[f]One surfactant utilized, the sorbitan monooleate, was SPAN 80 brand surfactant.
[g]The other surfactant utilized, the polyoxyethylene 20 sorbitan monooleate, was TWEEN 80 brand surfactant.
[h]The isoparaffinic hydrocarbon utilized was Isopar C brand isoparaffinic hydrocarbon, having a flash point of 40° F.

The copolymeric siloxanes that can be utilized in the formulation presented in Table 2 include poly(dimethyl)-co-poly(methyl, oxygen-containing) siloxane copolymers having weight-average molecular weights of about 1,000 to about 4,000, viscosities of about 10 to about 250 centipoise, and a "z" value (the mole percentage of silicon atoms having at least one methyl and oxygen-containing group attached thereto) of about 8 to 38 mole percent.

COMPARATIVE-TESTING EXAMPLES

To demonstrate the superior smear-recovery properties of emulsion polish compositions obtained from utilizing the copolymeric siloxanes of the present invention, certain comparative smear-recovery tests were performed. The results of these comparative smear-recovery tests clearly show the relative decrease in smear recovery time provided by the copolymeric siloxanes of the present invention, as compared to conventional siloxanes.

The comparative smear-recovery tests were conducted utilizing a Murakami brand Goniophotometer, specially outfitted with a solenoid-driven, spring-loaded swing arm. Parallel strands of either 220 micron or 320–325 micron diameter commercially-available monofilament fibers were utilized as the smear-causing medium. Fifteen-degree incident-specular reflectance of each substrate-applied film was monitored as a function of time-after-smearing. The films were cast on conventional 2.25 inch square nitrocellulose lacquer-coated glass slides. The backs of the glass slides were coated with black lacquer to prevent reflection from the back face of these glass slides. Percent smear recovery was measured as the percent specular reflectance, as compared to the specular reflectance before the film was smeared.

Procedure for Determining Smear Recovery

The procedure for determining the smear recovery of transparent thin films is as follows.

A Murakami brand, model GP-1R commercially-available Goniophotometer, specifically outfitted with a solenoid-driven swing arm was utilized. Attached to the swing arm was a ⅜ inch-wide smear medium. The smear medium consisted of a plurality of contacting, parallel strands of either 220 or 300-to-325 micron-diameter commercially-available monofilament line. Each such strand comprised an elongated, generally linear portion and a unitary, generally "C"-shaped portion at one end of the linear strand. Each such monofilament line strand was generally disposed, relative to a test substrate coupon, such that the generally linear strand portion was generally perpendicular to the test substrate while the curved portion of the monofilament strand rested on the surface of the test substrate.

Thus, the curved portion of each such strand of the plurality was disposed such that the curved portion of each such filament came into contact with the substrate, thereby to assure substantially complete contact of the plural strands over the test substrate area being smeared.

Each test substrate consisted of a 2.25 inch by 2.25 inch square of ⅛ inch-thick pieces of clear glass having a refractive index of about 1.50 to 1.52. It is important, for this procedure, that the lacquer and the glass have refractive index values that are about the same. Each such clear piece of glass, moreover, was coated with 1.25 grams of high-gloss nitrocellulose-containing furniture lacquer. Such lacquer included about 21.3 wt.-% non-volatile material. The glass-applied lacquer was cured slowly under a watch glass on a level surface, thereby to assure a smooth uniform finish on the piece of glass. The back of each such glass test slide was thus coated with a black lacquer to eliminate reflection from that surface. The lacquer-applied side of each such piece of glass had a refractive index of between 1.50 and 1.53.

Each such glass slide, thus-coated, was weighed on a conventional analytical balance capable of weighing to 0.01 milligrams. Each glass slide was thereafter placed onto a conventional spin coater. A 5 wt.-% non-volatile solution of the test copolymer composition was then caused to flow over the test slide. The solution-applied test slide was then immediately spun at 500 to 2500 revolutions per minute, until the solvent evaporated therefrom. The weight of each such thus-treated glass slide was thereafter noted, to thereby determine by difference the weight of the amount of copolymeric siloxane that was thus deposited thereon. The thickness of the thus-deposited residual film was then determined mathematically.

Thus treated, each test slide was inserted into the specimen holder of the Goniophotometer; and the 15 degree incident specular reflectance of the test surface was then measured directly. The solenoid-driven arm was activated to smear the test film. Such smearing resulted in a decrease in specular reflection of the test film. The specular reflectance of the film was monitored as a function of time to determine the amount of time that it took for the thus-disturbed film to recover to 95% of its original reflection.

Table 3, below, presents the time for 95% recovery of specular reflection for specific poly(dimethyl)-co-poly(methylalkyl) siloxane copolymers of the subject invention as well as for certain prior-art polydimethyl siloxanes which are being compared to the copolymeric siloxanes of the present invention.

TABLE 3

Smear Recovery, Comparative Data: Poly(dimethyl)-co-poly(methylalkyl) Siloxanes

| Siloxane Polymer | Copolymer Molecular Weight | Copolymer Viscosity Centipoise | x/A Values | Smear Recovery,[i] in sec. |
|---|---|---|---|---|
| Siloxane No. 1 | 2737 | 68 | 10%/$C_{10}$ | 2 |
| Siloxane No. 2 | 2834 | 67 | 10%/$C_{12}$ | 2 |
| Siloxane No. 3 | 2932 | 57 | 10%/$C_{14}$ | 1 |
| Siloxane No. 4 | 2951 | 68 | 10%/$C_{16}$ | 1 |
| Siloxane No. 5 | 3127 | 78 | 10%/$C_{18}$ | 1 |
| Siloxane No. 6 | 3224 | >119 | 10%/$C_{20}$ | 2 |
| Siloxane No. 7 | 3900 | 182 | 30%/$C_{14}$ | 5 |
| Siloxane "A"[j] | 2000 | 19 | —/— | 20 |
| Siloxane "B"[j] | 3780 | 48 | —/— | 30 |

Footnotes
[i]Smear recovery is the amount of time, expressed in seconds, that is needed to recover to 95% of the original reflectance value. The specular reflectance determination procedure, utilizing a 320 micron diameter smear pattern, is more particularly set forth in the above-noted procedure.
[j]The prior-art polysiloxanes identified in Table 3 are similar to those polysiloxanes disclosed in Examples 1 and 4 of U.S. Pat. No. 2,523,281 to Currie and in Examples 5 through 7 of U.S. Pat. No. 2,698,805 to Currie et al. In such prior-art polysiloxanes, the "x" and "A" values listed in Table 3 are nonexistent.

Siloxane No. 1 is polydimethyl-co-polymethyldecyl siloxane copolymer. Siloxane No. 2 is polydimethyl-co-polymethyldodecyl siloxane copolymer. Siloxane No. 3 is polydimethyl-co-polymethyl tetradecyl siloxane copolymer. Siloxane No. 4 is polydimethyl-co-polymethylhexadecyl siloxane copolymer. Siloxane No. 5 is polydimethyl-co-polymethyloctadecyl siloxane copolymer. Siloxane No. 6 is polydimethyl-co-polymethyleicosenyl siloxane copolymer. Siloxane No. 7 is polydimethyl-co-polymethytetradecyl siloxane copolymer. Siloxanes "A" and "B", both prior-art compounds, are polydimethyl siloxane polymers.

The results, as shown in Table 3 above demonstrate that, at comparable molecular weights, the smear-recovery properties of the poly(dimethyl)-co-poly(methylalkyl) siloxane copolymers of this invention are superior to the prior-art polydimethyl siloxanes. All of the compositions of the present invention recover to 95% of their initial specular reflectance in 5 seconds or less, as compared to the prior-art dimethyl siloxane-containing compositions which require 20 to 30 seconds.

The poly(dimethyl)-co-poly(methylalkyl) siloxane copolymers listed in Table 3 were prepared from commercially-available polydimethyl-co-polymethylhydrosiloxane precursors and commercially-available alpha-olefins, utilizing a well-known hydrosilylation reaction.

More specifically, synthesis of the siloxane copolymers was performed by the well-known hydrosilylation reaction of polydimethyl-co-polymethylhydrosiloxane (available either from Petrarch System, Inc., Dow Corning, or General Electric) and alpha-olefins of varying lengths (available from Aldrich). A round-bottomed flask equipped with magnetic stirring bar, condenser and calcium-chloride tube was charged with a 50 wt.-% solution of the reactants (up to 10% molar excess alpha-olefin) in dry toluene. A solution of hydrogen hexachloroplatinate (IV) in diglyme/isopropanol was then added to the reaction mixture (150 ppm pt). The reaction mixture was then stirred at 60° C. for three hours. At the end of this reaction period, the resultant mixture was refluxed with activated charcoal for 1 hour, and filtered hot. Finally, the solvent and excess alpha-olefins were removed under reduced pressure of 0.5 mm. Hg at 100° C. The reaction proceeded to completion as evidenced by the absence of the Si-H absorption at about 2160 cm$^{-1}$ in the infrared spectra. Residual alpha-olefin in the purified polymers was determined by gas-liquid chromatography. In all siloxane copolymers thus produced, residual alpha-olefin was less than 4 wt.-%.

Still more particularly, the reactants that were utilized to prepare the siloxanes presented in Table 3 are as follows.

In preparing Siloxane No. 1. the hydrosiloxane precursor was poly(90%)dimethyl-co-poly(10%)methylhydrosiloxane, and the alpha-olefin was 1-decene. In preparing Siloxane No. 2, the hydrosiloxane precursor was poly(90%)dimethyl-co-poly(10%)methylhydrosiloxane, and the alpha-olefin was 1-dodecene. In preparing Siloxane No. 3, the hydrosiloxane precursor was poly(90%)dimethyl-co-poly(10%)methylhydrosiloxane, and the alpha-olefin was 1-tetradecene. In preparing Siloxane No. 4, the hydrosiloxane precursor was poly(90%)dimethyl-co-poly(10%)methylhydrosiloxane, and the alpha-olefin was 1-hexadecene. In preparing Siloxane No. 5, the hydrosiloxane precursor was poly(90%)dimethyl-co-poly(10%)methylhydrosiloxane, and the alpha-olefin was 1-octadecene. In preparing Siloxane No. 6, the hydrosiloxane precursor was poly(90%)dimethyl-co-poly(10%)methylhydrosiloxane, and the alpha-olefin was 1-eicosene. In preparing Siloxane No. 7, the hydrosiloxane precursor was poly(70%)dimethyl-co-poly(30%)methylhydrosiloxane, and the alpha-olefin was 1-tetradecene.

Table 4, below, presents the amount of time that is necessary to achieve a 95% recovery of specular reflection, for those emulsion polish compositions made from specified poly(dimethyl)-co-poly(methyl, oxygen-containing) siloxane copolymers of the present invention, in comparison to specular reflection recovery times of certain emulsion polish compositions made from specific prior-art polydimethyl siloxanes.

The poly(dimethyl)-co-poly(methyl, oxygen-containing) siloxanes, listed in Table 4 as Siloxane Nos. 8 through 15, each had the —COO— moiety as its "L" value and the —$C_2H_5$ radical as its "R" value.

TABLE 4

Smear Recovery, Comparative Tests:
Poly(dimethyl)-co-poly(methyl, oxygen-containing) Siloxanes

| Siloxane Polymer | Copolymer Molecular Weight | Copolymer Viscosity Centipoise | z/n/i Values | Smear Recovery,[k] in sec. |
|---|---|---|---|---|
| Siloxane No. 8 | 3968 | 30 | 8%/0/10 | 6 |
| Siloxane No. 9 | 4142 | 28 | 8%/1/10 | 4 |
| Siloxane No. 10 | 4316 | 35 | 8%/2/10 | 4 |
| Siloxane No. 11 | 4490 | 71 | 8%/3/10 | 5 |
| Siloxane No. 12 | 2914 | 37 | 10%/0/10 | 0.2 |
| Siloxane No. 13 | 3051 | 78 | 10%/1/10 | 0.4 |
| Siloxane No. 14 | 3189 | 110 | 10%/2/10 | 1 |
| Siloxane No. 15 | 3327 | 100 | 10%/3/10 | 1 |
| Siloxane "C"[l] | 3780 | 48 | —/—/— | 24.9 |

Footnotes
[k] Smear recovery is the amount of time, expressed in seconds, that is needed to recover to 95% of the original reflectance value. The specular reflectance determination procedure, utilizing a 220 micron diameter smear pattern, is more particularly set forth in the above-noted procedure.
[l] The prior-art polysiloxane identified in Table 4 is similar to those polysiloxanes disclosed in Examples 1 and 4 of U.S. Pat. No. 2,523,281 to Currie and in Examples 5 through 7 of U.S. Pat. No. 2,698,805 to Currie et al. In such prior-art polysiloxanes, and in that prior-art siloxane presented in Table 4, the "R", "L", "z", "n" and "i" values are nonexistent.

Siloxane No. 8 is polydimethyl-co-polymethylethylundecanoatyl siloxane copolymer. Siloxane No. 9 is polydimethyl-co-polymethylmethoxyethylundecanoatyl siloxane copolymer. Siloxane No. 10 is polydimethyl-co-polymethyl ethoxyethoxyethylundecanoatyl siloxane copolymer. Siloxane No. 11 is polydimethyl-co-polymethylethoxyethoxyethoxyethylundecanoatyl siloxane copolymer. Siloxane No. 12 is polydimethyl-co-polymethylethylundecanoatyl siloxane copolymer. Siloxane No. 13 is polydimethyl-co-polymethylmethoxyethylundecanoatyl siloxane copolymer. Siloxane No. 14 is polydimethyl-co-polymethylethoxyethoxyethylundecanoatyl siloxane copolymer. Siloxane No. 15 is polydimethyl-co-polymethylethoxyethoxyethoxyethylundecanoatyl siloxane copolymer. Siloxane "C". a prior-art compound, is polydimethyl siloxane polymer.

The procedure that was utilized to produce those above-discussed Siloxanes numbered 1 through 7 was also utilized to produce those Siloxanes numbered 8 through 15, with the following exceptions.

Siloxane No. 8 was produced from poly(92%)dimethyl-co-poly(8%)methylhydrosiloxane and the oxygen-containing compound referred to as ethyl undecenoate, where one well-known procedure for producing this type of oxygen-containing compound is set forth in Vogel's Textbook of Practical Organic Chemistry 4th ed., published 1981, at page 512. Siloxane No. 9 was produced from poly(92%)dimethyl-co-poly(8%)methylhydrosiloxane and the oxygen-containing compound referred to as methoxyethylundecenoate, where one well-known procedure for producing this type of oxygen-containing compound is set forth in the above-cited Vogel text. Siloxane No. 10 was produced from poly(92%)dimethyl-co-poly(8%)methylhydrosiloxane and the oxygen-containing compound referred to as ethoxyethoxyethylundecenoate, where one well-known procedure for producing this type of oxygen-containing compound is set forth in the above-cited Vogel text. Siloxane No. 11 was produced from poly(92%)dimethyl-co-poly(8%)methylhydrosiloxane and the oxygen-containing compound referred to as ethoxyethoxyethoxyethylundecenoate, where one well-known procedure for producing this type of oxygen-containing compound is set forth in the above-cited Vogel text. Siloxane No. 12 was produced from poly(90%)dimethyl-co-poly(10%)methylhydrosiloxane and ethylundecenoate. Siloxane No. 13 was produced from poly(90%)dimethyl-co-poly(10%)methylhydrosiloxane and methoxyethylundecenoate. Siloxane No. 14 was produced from poly(90%)dimethyl-co-poly(10%)methylhydrosiloxane and ethoxyethylundecenoate. Siloxane No. 15 was produced from poly(90%)dimethyl-co-poly(10%)methylhydrosiloxane and ethoxyethoxyethylundecenoate.

The results, as shown in Table 4 above, demonstrate that, at comparable molecular weights, the smear-recovery properties of the poly(dimethyl)-co-poly(methyl, oxygen-containing) siloxane copolymers of this invention are superior to the prior-art polydimethyl siloxane presented. All of our Siloxanes numbered 8 through 15 in Table 4 recover to 95% of their initial specular reflectance in 6 seconds or less, as compared to the prior-art dimethyl siloxane which requires about 25 seconds.

Table 5, below, presents the amount of time that is necessary to achieve a 95% recovery of specular reflection, for those emulsion polish compositions made from other specified poly(dimethyl)-co-poly(methyl, oxygen-containing) siloxane copolymers of the present invention, in comparison to specular reflection recovery times of certain emulsion polish compositions made from specific prior-art polydimethyl siloxanes.

The poly(dimethyl)-co-poly(methyl, oxygen-containing) siloxanes, listed in Table 5 as Siloxane Nos. 16 and 17, each had the —O— moiety as its "L" value and the —$CH_3$ radical as its "R" value.

TABLE 5

Smear Recovery, Comparative Tests:
Poly(dimethyl)-co-poly(methyl, oxygen-containing) Siloxanes

| Siloxane Polymer | Copolymer Molecular Weight | Copolymer Viscosity Centipoise | z/n/i Values | Smear Recovery,[m] in sec. |
|---|---|---|---|---|
| Siloxane "D"[n] | 2000 | 19 | —/—/— | 11 |
| Siloxane No. 16 | 2734 | 22 | 12%/2/3 | 3 |
| Siloxane No. 17 | 3443 | 18 | 12%/3/3 | 2 |
| Siloxane "E"[n] | 3780 | 48 | —/—/— | 30 |

Footnotes
[m]Smear recovery is the amount of time, expressed in seconds, that is needed to recover to 95% of the original reflectance value. The specular reflectance determination procedure, utilizing a 320 micron diameter smear pattern, is more particularly set forth in the above-noted procedure.
[n]The prior-art polysiloxanes identified in Table 5 are similar to those polysiloxanes disclosed in Examples 1 and 4 of U.S. Pat. No. 2,523,281 to Currie and in Examples 5 through 7 of U.S. Pat. No. 2,698,805 to Currie et al. In such prior-art polysiloxanes, and in those prior-art compounds presented in Table 5 as Siloxanes "D" and "E", the "R", "L", "z", "n" and "i" values are nonexistent.

The procedure utilized to produce those Siloxanes numbered 1 through 7 was utilized to produce those Siloxanes numbered 16 and 17 in Table 5, with the following exceptions.

Siloxane No. 16, polydimethyl-co-polymethylmethoxyethoxypropylsiloxane, was produced from poly(88%)dimethyl-co-poly(12%)methylhydrosiloxane and the oxygen-containing compound referred to as methoxyethoxyallyl, where one well-known procedure for producing this oxygen-containing compound is set forth in U.S. Pat. No. 4,260.725 to Keogh and Kinzler. Siloxane No. 17. polydimethyl-co-polymethoxyethoxyethoxypropylsiloxane, was produced from poly(88%)dimethyl-co-poly(12%)methylhydrosiloxane and the oxygen-containing compound referred to as methoxyethoxyethoxyallyl, where one well-known procedure for producing this oxygen-containing compound is also set forth in U.S. Pat. No. 4,260,725. Siloxanes "D" and "E", both prior-art compounds, are polydimethyl siloxane polymer.

The results, as shown in Table 5 above, demonstrate that, at comparable molecular weights, the smear-recovery properties of the poly(dimethyl)-co-poly(methyl, oxygen-containing) siloxane copolymers of this invention are superior to the prior-art polydimethyl siloxanes presented. Both of our Siloxanes, numbered 16 and 17 in Table 5, recover to 95% of their initial specular reflectance in 3 seconds or less, as compared to the prior-art dimethyl siloxanes which require 11 and 30 seconds.

The weight-average molecular weight determinations of these copolymeric siloxanes were calculated, based on supplier literature and determined mole percentages of Si-H. The viscosities of these copolymeric siloxanes were determined at 25° C. utilizing a Brookfield, model HBT-200, cone-and-plate viscometer, a Brookfield model LVT viscometer, or a Bohlin Rheometer. Most viscosities were determined at 20 rpm, when utilizing the Brookfield model HBT-200 viscometer.

The copolymeric siloxanes were applied onto substrate surfaces by spincoating 5 wt.-% solutions of copolymeric siloxane in 2,2,4-trimethylpentane solvent, onto conventional 2.25 inch by 2.25 inch square nitrocellulose lacquer-coated test slides. The spin-coating procedure utilized was to flood the surface with solution, and then to spin the slide at 500–2500 rpm while the solution dried. Conditions were varied to attain a desired thickness for comparison purposes (2000–4000 Angstroms). Thickness was determined gravimetrically.

The above-mentioned, comparative smear-recovery data for the polymeric siloxanes of the present invention, namely the poly(dimethyl)-co-poly(methylalkyl) siloxane and poly(dimethyl)-co-poly(methyl, oxygen-containing) siloxane copolymers, relative to certain prior-art polymeric siloxanes, are thus summarized in Tables 3–5.

What has been described herein are two copolymeric siloxanes that are particularly applicable for inclusion in an emulsion polish composition. While the novel polymeric siloxanes disclosed herein have been discussed with reference to particular emulsion polish compositions, the present invention is not limited to those particular emulsion polish compositions disclosed herein. Indeed, the foregoing specification is intended to be illustrative and is thus not to be taken as limiting. It is therefore anticipated that alternatives, changes or modifications will become apparent to those skilled in the art upon reference to the foregoing detailed description of the present invention. Accordingly, such alternatives, changes and modifications are to be considered as forming a part of our present invention insofar as they fall within the spirit and scope of the appended claims.

We claim:

1. A surface-treating emulsion polish composition for furniture and similar household items comprising water, at least one hydrocarbon solvent, at least one surfactant, and at least one copolymeric siloxane selected for the group Consisting of a poly(dimethyl)-co-poly(methylalkyl) siloxane polymer, a poly(dimethyl)-co-poly(methyl, oxygen-containing) siloxane polymer, and combinations thereof, wherein the poly(dimethyl)-co-poly(- methylalkyl) siloxane copolymer has a molecular weight of about 2,500 to about 4,000 and the general formula

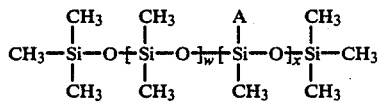

wherein A is an alkyl radical having 10 to 20 carbon atoms, and wherein w is about 70 to about 91 mole percent and x is about 9 to about 30 mole percent of the poly(dimethyl)-co-poly(methylalkyl) siloxane polymer, and wherein the poly(dimethyl)-co-poly(methyl, oxygen-containing) siloxane copolymer has the general formula

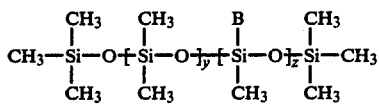

wherein B is $(CH_2)_i(L)(CH_2CH_2O)_nR$, wherein i is an integer from 3 to 10 inclusive, wherein L is —O— or —COO—, wherein n is either zero or an integer from 1 to 3 inclusive, wherein R is —H, —CH$_3$, or —C$_2$H$_5$, and wherein y is about 62 to about 92 mole percent and z is about 8 to about 38 mole percent of the poly(dimethyl)-co-poly(methyl, oxygen-containing) siloxane copolymer.

2. The emulsion polish composition of claim 1 wherein the copolymeric siloxane is the poly(dimethyl)-co-poly(methylalkyl) siloxane polymer.

3. The emulsion polish composition of claim 2 wherein x is 10 mole percent and A is selected from the group consisting of $C_{10}$, $C_{12}$, $C_{14}$, $C_{16}$, $C_{18}$ and $C_{20}$.

4. The emulsion polish composition of claim 2 wherein x is 30 mole percent and A is $C_{14}$.

5. The emulsion polish composition of claim 1 wherein the copolymeric siloxane is the poly(dimethyl)-co-poly(methyl, oxygen-containing) siloxane copolymer.

6. The emulsion polish composition of claim 5 wherein L is —COO—, R is —C$_2$H$_5$, i is 10, and z is either 8 mole percent or 10 mole percent.

7. The emulsion polish composition of claim 5 wherein L is —O—, R is —CH$_3$, i is 3, z is 12 mole percent, and n is either 2 or 3.

8. The emulsion polish composition of claim 1 further comprising an aerosol propellant.

9. An aerosol container containing the emulsion polish composition of claim 8.

* * * * *

UNITED STATES PATENT AND TRADEMARK OFFICE
CERTIFICATE OF CORRECTION

PATENT NO. : 4,936,914  
DATED : June 26, 1990  
INVENTOR(S) : Hurley et al.

Page 1 of 2

It is certified that error appears in the above-identified patent and that said Letters Patent is hereby corrected as shown below:

On the cover page, in the left column, after the designation "Assignee", please change "S. C. Johnson & Con, Inc." to -- "S. C. Johnson & Son, Inc."

Column 2, line 17, please insert a comma [,] immediately after the word "organopolysiloxanes".

Column 2, line 18, please insert a comma [,] immediately after the word "compositions".

Column 2, line 51, please insert a period [.] immediately after the word "reviewed".

Column 7, line 37, please insert a comma [,] immediately following the expression "That is".

Column 8, line 25, please insert a comma [,] immediately following the word "hexane".

In claim 1, at column 18, line 65, please substitute the word "Consisting" with the word -- consisting --.

UNITED STATES PATENT AND TRADEMARK OFFICE
CERTIFICATE OF CORRECTION

PATENT NO. : 4,936,914

DATED : June 26, 1990

INVENTOR(S) : Hurley et al.

It is certified that error appears in the above-identified patent and that said Letters Patent is hereby corrected as shown below:

In claim 1, at column 19, line 13, please substitute the parenthetical expression -- (dimethyl) -- for the parenthetical expression "(dimethyl)".

Signed and Sealed this

Twenty-fifth Day of June, 1991

Attest:

HARRY F. MANBECK, JR.

Attesting Officer

Commissioner of Patents and Trademarks